United States Patent
Cullum

(10) Patent No.: US 10,744,951 B2
(45) Date of Patent: Aug. 18, 2020

(54) GUN TOTE SYSTEM

(71) Applicant: Edward J. Cullum, Commack, NY (US)

(72) Inventor: Edward J. Cullum, Commack, NY (US)

(*) Notice: Subject to any disclaimer, the term of this patent is extended or adjusted under 35 U.S.C. 154(b) by 0 days.

(21) Appl. No.: 16/016,201

(22) Filed: Jun. 22, 2018

(65) Prior Publication Data

US 2019/0337460 A1 Nov. 7, 2019

Related U.S. Application Data

(60) Provisional application No. 62/667,821, filed on May 7, 2018.

(51) Int. Cl.
*B60R 7/00* (2006.01)
*B60R 7/14* (2006.01)
*F41C 33/06* (2006.01)
*B60R 9/06* (2006.01)

(52) U.S. Cl.
CPC ............... *B60R 7/14* (2013.01); *B60R 9/065* (2013.01); *F41C 33/06* (2013.01)

(58) Field of Classification Search
CPC ............ B60R 9/065; B60R 7/14; F41C 33/06
USPC ................................................ 224/531, 274
See application file for complete search history.

(56) References Cited

U.S. PATENT DOCUMENTS

| | | | | | |
|---|---|---|---|---|---|
| 2,623,639 | A | * | 12/1952 | Levy | A47B 81/005 211/4 |
| 2,855,108 | A | * | 10/1958 | Haapala | A47B 81/005 211/64 |
| 2,958,422 | A | * | 11/1960 | Caloiero | A47B 81/005 211/4 |
| 4,113,107 | A | * | 9/1978 | Jaeger | A47B 81/005 211/4 |
| 4,132,315 | A | * | 1/1979 | Young | E05B 73/00 211/4 |
| 4,181,221 | A | * | 1/1980 | Tennant | A47B 81/005 206/317 |
| 4,461,385 | A | * | 7/1984 | Clouser | A47B 81/005 211/4 |
| 5,454,931 | A | * | 10/1995 | Lauve, Jr. | F41A 23/18 206/317 |
| 5,657,883 | A | * | 8/1997 | Badia | A01K 97/10 211/60.1 |
| 5,678,700 | A | * | 10/1997 | Crosson, Jr. | A01K 97/10 211/60.1 |
| 6,360,902 | B1 | * | 3/2002 | Searles | A01K 97/10 211/70.8 |
| 6,547,085 | B2 | * | 4/2003 | Belisle | A47B 81/005 211/85.7 |
| 8,444,034 | B2 | * | 5/2013 | Bennett | F41A 23/18 211/64 |
| 2004/0232182 | A1 | * | 11/2004 | Ingram | B60R 7/14 224/401 |

(Continued)

*Primary Examiner* — Peter N Helvey

(57) ABSTRACT

A container has a floor and an elevationally spaced open top, a left side wall and a laterally spaced right side wall, and a rear wall and an open front. A plurality of spacer panels are vertically oriented and parallel with the left and right side walls to create a plurality of chambers between the plurality of spacer panels for removably receiving individual guns from a plurality of guns. The spacer panels each extend upwardly from the floor to a location closely spaced beneath the open top.

2 Claims, 3 Drawing Sheets

(56) References Cited

U.S. PATENT DOCUMENTS

| | | | | |
|---|---|---|---|---|
| 2011/0114687 A1* | 5/2011 | Wellborn | ................... | B60R 7/14 |
| | | | | 224/401 |
| 2011/0168649 A1* | 7/2011 | Stolz | .................... | A47B 81/005 |
| | | | | 211/4 |
| 2012/0228243 A1* | 9/2012 | Crigger | .............. | G07C 9/00158 |
| | | | | 211/7 |
| 2014/0097222 A1* | 4/2014 | Robinson | ................... | B60R 7/14 |
| | | | | 224/401 |
| 2015/0101516 A1* | 4/2015 | Suggs | ................... | A47B 81/005 |
| | | | | 109/64 |
| 2015/0272324 A1* | 10/2015 | Self | ...................... | A47B 81/005 |
| | | | | 211/64 |

* cited by examiner

GUN TOTE SYSTEM

RELATED APPLICATION

This application is based upon and claims priority of Provisional Application No. 62/667,821 filed May 7, 2018, the subject matter of which is incorporated herein by reference.

BACKGROUND OF THE INVENTION

Field of the Invention

The present invention relates to a gun tote system and more particularly pertains to removably receiving and transporting a plurality of shotguns and transporting them in a safe, convenient, and economical manner.

Description of the Prior Art

The use of gun receiving and transporting systems of known designs and configurations is known in the prior art. More specifically, gun receiving and transporting systems of known designs and configurations previously devised and utilized for the purpose of receiving and transporting guns are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, they do not describe a gun tote system for removably receiving and transporting a plurality of shotguns and transporting them in a safe, convenient, and economical manner.

In this respect, the gun tote system according to the present invention substantially departs from the conventional concepts and designs of the prior art, and in doing so provides an apparatus primarily developed for the purpose of removably receiving and transporting a plurality of shotguns and transporting them in a safe, convenient, and economical manner.

Therefore, it can be appreciated that there exists a continuing need for a new and improved gun tote system which can be used for removably receiving and transporting a plurality of shotguns and transporting them in a safe, convenient, and economical manner. In this regard, the present invention substantially fulfills this need.

SUMMARY OF THE INVENTION

In view of the disadvantages inherent in the known types of gun receiving and transporting systems of known designs and configurations now present in the prior art, the present invention provides an improved gun tote system. As such, the general purpose of the present invention, which will be described subsequently in greater detail, is to provide a new and improved gun tote system and method which has all the advantages of the prior art and none of the disadvantages.

To attain this, from a broad perspective, first provided is a container having a floor and an elevationally spaced open top, a left side wall and a laterally spaced right side wall, and a rear wall and an open front. A plurality of spacer panels are vertically oriented and parallel with the left and right side walls to create a plurality of chambers between the plurality of spacer panels for removably receiving individual guns from a plurality of guns. The spacer panels each extend upwardly from the floor to a location closely spaced beneath the open top.

There has thus been outlined, rather broadly, the more important features of the invention in order that the detailed description thereof that follows may be better understood and in order that the present contribution to the art may be appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention is regarded as including such equivalent constructions insofar as they do not depart from the spirit and scope of the present invention.

It is therefore an object of the present invention to provide a new and improved gun tote system which has all the advantages of the prior gun receiving and transporting systems of known designs and configurations and none of the disadvantages.

It is another object of the present invention to provide a new and improved gun tote system which may be easily and efficiently manufactured and marketed.

It is a further object of the present invention to provide a new and improved gun tote system which is of durable and reliable constructions.

An even further object of the present invention is to provide a new and improved gun tote system which is susceptible of a low cost of manufacture with regard to both materials and labor, and which accordingly is then susceptible of low prices of sale to the consuming public, thereby making such gun tote system economically available.

Lastly, it is an object of the present invention to provide a gun tote system for removably receiving and transporting a plurality of shotguns and transporting them in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
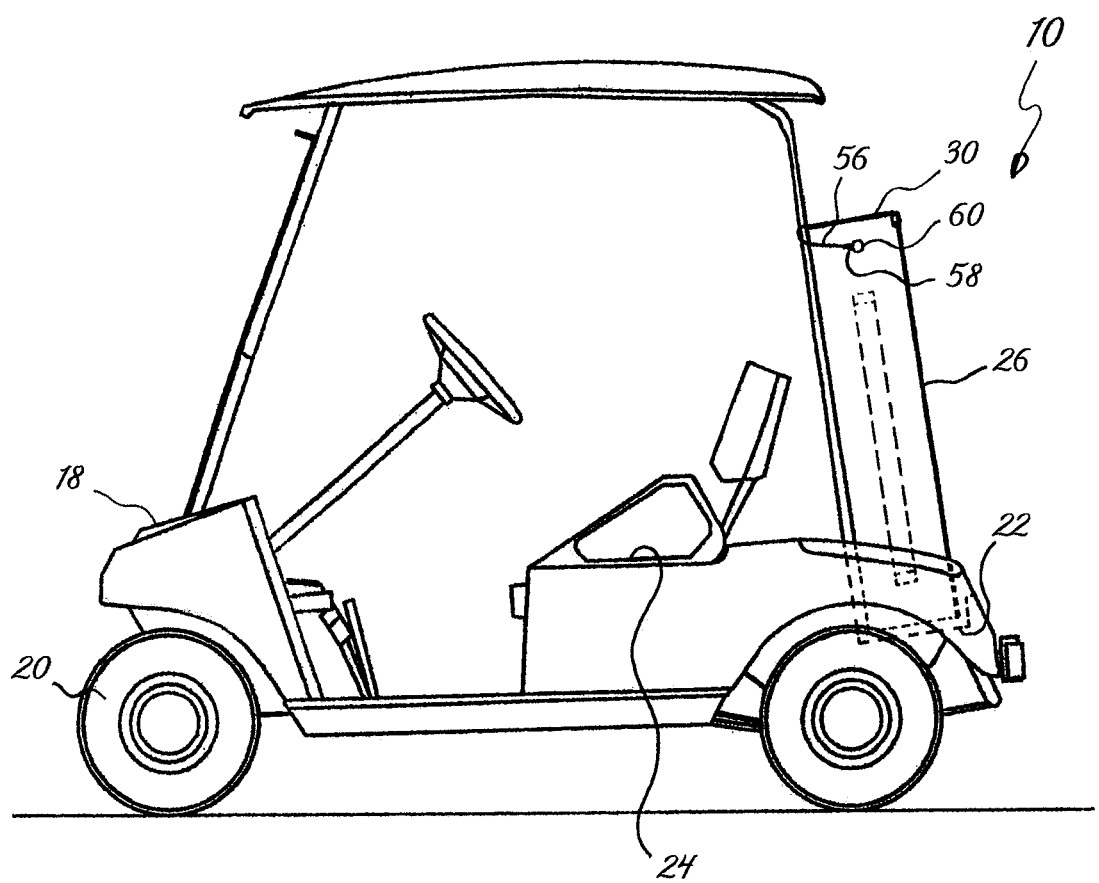
FIG. 1 is a side elevational view of a gun tote system constructed in accordance with the principles of the present invention.
Figure 2:
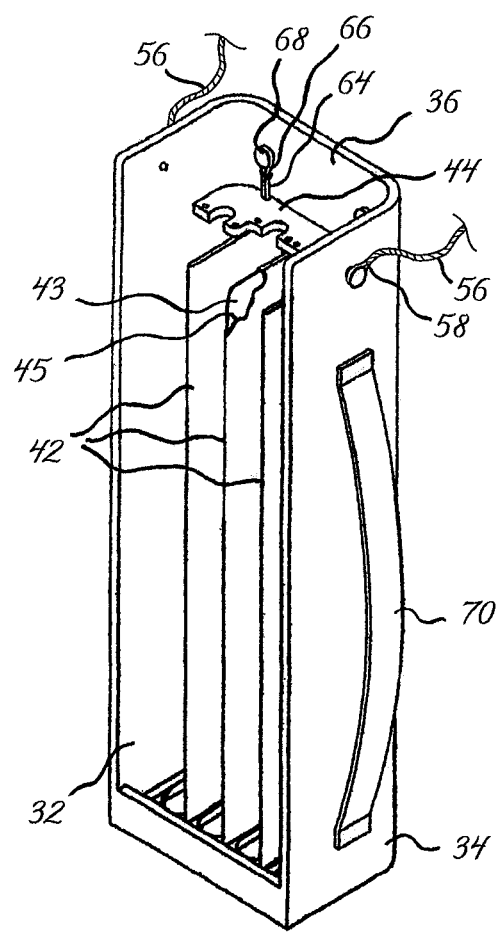
FIG. 2 is a perspective illustration of the container shown in FIG. 1, the spacer panels being partly broken away and shown in section.
Figure 3:
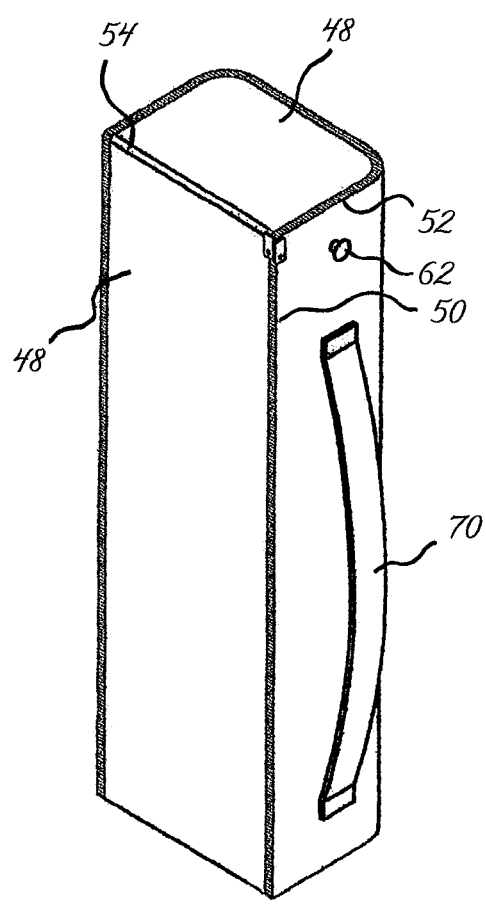
FIG. 3 is a perspective illustration similar to FIG. 2 showing the container with the cover.
Figures 4, 5, 6, 7:
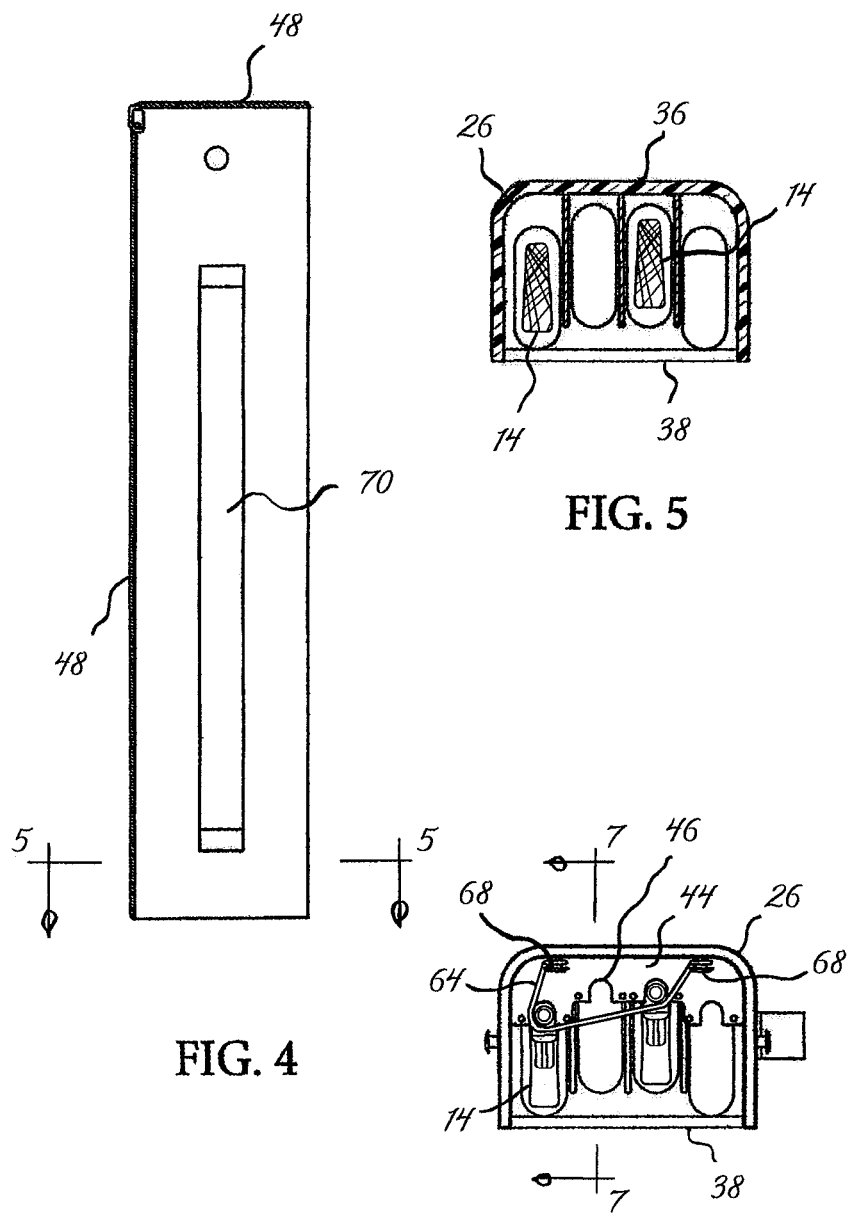
FIG. 4 is a right side elevational view of the container shown in FIG. 3.
FIG. 5 is a cross sectional view taken along line 5-5 of FIG. 4 facing downwardly adjacent to the floor of the container.
FIG. 6 is a top plan view facing downwardly adjacent to the open top of the container.
FIG. 7 is a cross sectional view taken along line 7-7 of FIG. 6.

With reference now to the drawings, and in particular to FIG. 1 thereof, the preferred embodiment of the new and improved gun tote system embodying the principles and concepts of the present invention and generally designated by the reference numeral 10 will be described.

The present invention, the gun tote system 10 is comprised of a plurality of components. Such components are individually configured and correlated with respect to each other so as to attain the desired objective. In their broadest context such include a container and a plurality of spacer panels.

The gun tote system 10 is for removably receiving a plurality of shotguns 14 and for transporting the plurality of shotguns. The receiving and the transporting are done in a safe, convenient, and economical manner. In the preferred embodiment, first provided is a vehicle 18 having a front, a back, a left side, a right side, a top, and a bottom. The vehicle has wheels 20 depending from the bottom of the vehicle for transportation purposes. A bench 24 is provided in the front of the vehicle for at least one person for driving the vehicle. A platform 22 extends rearwardly from the back of the vehicle adjacent to the bottom of the vehicle for support purposes.

Each of the plurality of shotguns 14 has a stock below and a barrel above.

Next provided is a container 26 having a floor 28 and an elevationally open top 30. The container also has a left side wall 32 and a laterally spaced right side wall 34. The container has a rear wall 36 and an open front 38.

A plurality of spacer panels 42 are provided. The spacer panels are vertically oriented and parallel with the left and right side walls of the container to create a plurality of chambers between the plurality of spacer panels for removably receiving individual shotguns from the plurality of guns. The spacer panels each extend upwardly from the floor to a location closely spaced beneath the open top. Each of the plurality of spacer panels is formed of a rigid base 43 and a covering of elastomeric foam 45. A separation plate 44 is horizontally disposed between the open top and the spacer panels. A plurality of U-shaped notches 46 are provided in the separation plate with one notch of the notches between adjacent spacer panels.

Next provided are handling components. The principal handling component is a cover 48 adapted for encompassing the container, access to the container is through a vertical zipper 50 and a horizontal zipper 52 in a C-shaped configuration, the zippers configured to accept a locking means for disabling the access, a horizontal slot 54 is formed in a upper front region of the cover.

An exterior bungee cord 56 of an elastic material having looped ends 58 that connect to left and right side buttons 60, 62 to separably couple the container and the vehicle. An interior bungee cord 64 of an elastic material having looped ends 66 that connect to rear buttons 68 for securing the shotguns within the chambers.

The handling components also includes an exterior container strap 70 of an inelastic material coupled to the right side wall from adjacent to the open top and the floor.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gun tote system comprising:
    a container having a floor and an elevationally spaced open top, the container also having a left side wall and a laterally spaced right side wall, the container having a rear wall and an open front; and
    a plurality of spacer panels vertically oriented and parallel with the left and right side walls to create a plurality of chambers between the plurality of spacer panels for removably receiving and fully separating individual guns from the plurality of guns, the spacer panels each extending upwardly from the floor to a location closely spaced beneath the open top;
    each of the plurality of spacer panels being formed of a rigid base and a covering of elastomeric foam, a separation plate horizontally disposed between the open top and the spacer panels, a plurality of U-shaped notches in the separation plate with one notch between adjacent spacer panels
    a vehicle having a front and a back and a left side and a right side and a top and a bottom, the vehicle having wheels depending from the bottom of the vehicle for transportation purposes, a bench in the front of the vehicle for at least one person for driving the vehicle, a platform extending rearwardly from the back of the vehicle adjacent to the bottom of the vehicle for support the container, the spacer panels extending upwardly and forwardly from the platform of the vehicle.

2. A gun tote system (10) for removably receiving a plurality of shotguns (14) and for transporting the plurality of shotguns, the system comprising, in combination:
    a vehicle (18) having a front and a back and a left side and a right side and a top and a bottom, the vehicle having wheels (20) depending from the bottom of the vehicle for transportation purposes, a bench (24) in the front of the vehicle for at least one person for driving the vehicle, a platform (22) extending rearwardly from the back of the vehicle adjacent to the bottom of the vehicle for support purpose;

the plurality of shotguns (14), each shotgun having a stock below and each gun having a barrel above;

a container (26) having a floor (28) and an elevationally spaced open top (30), the container also having a left side wall (32) and a laterally spaced right side wall (34), the container having a rear wall (36) and an open front (38);

a plurality of spacer panels (42) vertically oriented and parallel with the left and right side walls to create a plurality of chambers between the plurality of spacer panels for removably receiving individual shotguns from the plurality of guns, the spacer panels each extending upwardly from the floor to a location closely spaced beneath the open top, each of the plurality of spacer panels being formed of a rigid base (43) and a covering of elastomeric foam (45), a separation plate (44) horizontally disposed between the open top and the spacer panels, a plurality of U-shaped notches (46) in the separation plate with one notch between adjacent spacer panels;

handling components including a cover (48) adapted for encompassing the container, the cover is removable by means of a vertical zipper (50) and a horizontal zipper (52) in a C-shaped configuration;

an exterior bungee cord (56) of an elastic material having looped ends (58) that connect to left and right side buttons (60), (62) to separably couple the container and the vehicle;

an interior bungee cord (64) of an elastic material having looped ends 66 that connect to rear buttons (68) for securing the shotguns within the chambers; and an exterior container strap (70) of an inelastic material is coupled to the right side wall from adjacent to the open top and the floor.

\* \* \* \* \*